(No Model.) 2 Sheets—Sheet 1.
H. P. KENT.
DEVICE FOR MANUFACTURING WATCH RIM CENTERS.
No. 585,821. Patented July 6, 1897.
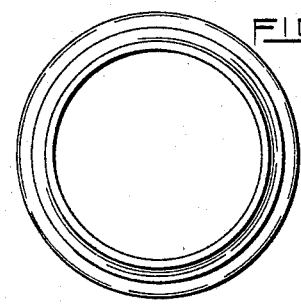
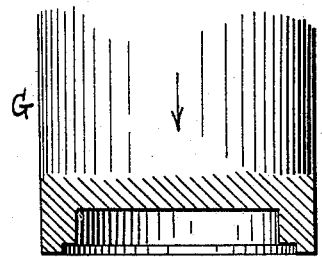
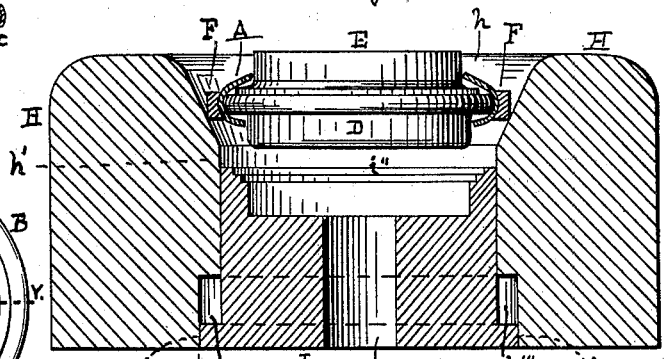
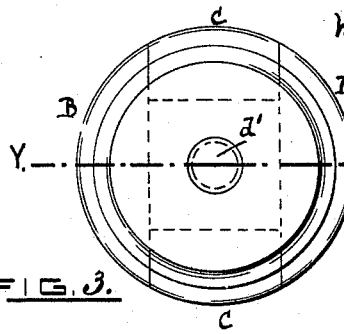
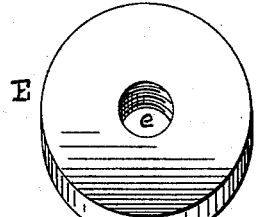
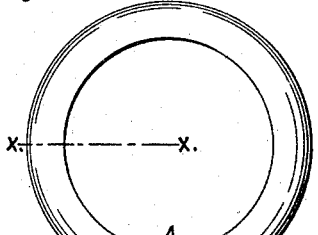
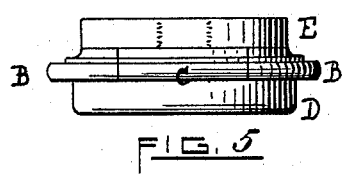
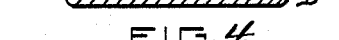
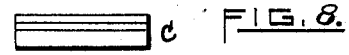
WITNESSES. INVENTOR.
Charles T. Hannigan Huxham P. Kent
M. Foster By Warren R. Perce
Atty.

(No Model.) 2 Sheets—Sheet 2.

H. P. KENT.
DEVICE FOR MANUFACTURING WATCH RIM CENTERS.

No. 585,821. Patented July 6, 1897.

UNITED STATES PATENT OFFICE.

HUXHUM P. KENT, OF PROVIDENCE, RHODE ISLAND.

DEVICE FOR MANUFACTURING WATCH-RIM CENTERS.

SPECIFICATION forming part of Letters Patent No. 585,821, dated July 6, 1897.

Application filed March 9, 1896. Serial No. 582,323. (No model.)

*To all whom it may concern:*

Be it known that I, HUXHUM P. KENT, of the city and county of Providence, in the State of Rhode Island, have invented a certain new and useful Improvement in Devices for the Manufacture of Watch-Rim Centers; and I declare the following to be a specification thereof, reference being had to the accompanying drawings.

Figure 14:
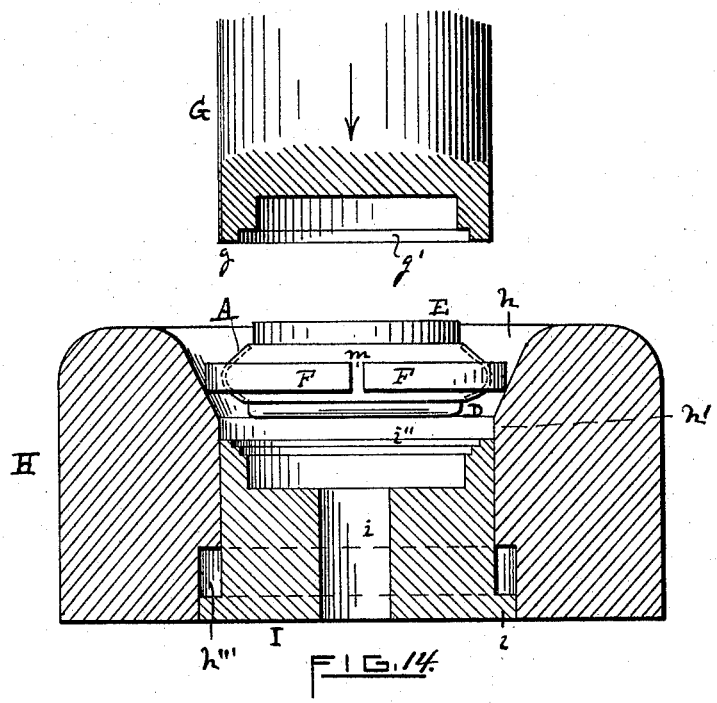
Figure 15:
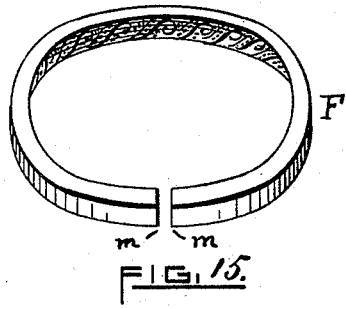

Figure 1 is a top plan of the watch-rim center made by my invention. Fig. 2 is a side elevation of the same, showing in part the external and in part the internal portions of the rim. Fig. 3 shows in top plan the series of dies for forming the watch-rim, together with the block and nut for holding said dies in position. Fig. 4 is a section of said dies, block, and nut as seen on line $y\ y$ of Fig. 3. Fig. 5 is a side elevation of said dies, block, and nut. Fig. 6 is a perspective view of said nut. Figs. 7 and 8 are respectively a top plan and side elevation of one of said dies, and Figs. 9 and 10 are respectively a top plan and side elevation of another of said dies. Fig. 11 shows, partly in elevation and partly in diametrical section, the said dies, block, and nut, the stock on which the same operate, the split-ring die to form the external portion of the watch-rim, and the plunger, dies, and die-block used to shape said watch-rim. Fig. 12 is a top plan of the watch-rim center before it is operated on by said dies. Fig. 13 is a view of the same as seen on line $x\ x$ of Fig. 12. Fig. 14 is the same as Fig. 11 except that the split-ring die and the blank are shown in elevation instead of in diametrical section. Fig. 15 is a perspective view of said split-ring die.

Like letters indicate like parts.

My invention relates to means for manufacturing watch-rim centers; and it consists of certain dies made as hereinafter particularly described and adapted to simultaneously form the outside and inside of said rim when used in combination with a die and plunger.

In the drawings, in Figs. 12 and 13 I show the usual annular metallic blank A, which is to be shaped into the watch-rim. The set of dies coöperating to form the interior surface of the watch-rim consists of the two segment-shaped dies B B and the two dies C C, each of the latter having three plane sides and one curved side, which is in the arc of a circle, the whole four presenting, when assembled as shown in Fig. 3, a true complete external circle, while the inner plane edges of said dies are consecutively at right angles to each other when in the position shown in said Fig. 3. D is a block to hold and support said dies B B C C. The block D has a central square hub $d$ integral therewith, from the center of which and integral with it is a cylindrical screw-threaded boss or portion $d'$.

E is a nut or circular disk of a diameter equal to that of the inner edge of the watch-rim, and it has at its center a circular aperture $e$, screw-threaded so as to be engageable with the boss $d'$ of the block D.

The dies B B C C are placed within the blank A and spread radially until their arc-shaped edges are in contact with the inner surface of the blank A, as seen in Fig. 11. When so spread, the dies B B C C leave a central square space or aperture, into which the square hub $d$ of the block D exactly fits. The nut or disk E, being screwed down on the boss $d'$ of the block D, holds all said parts in the proper working position, which is seen in Figs. 3, 4, 5, and 11.

In Fig. 15 is shown the split-ring die F, which shapes and ornaments the extreme central annulus or bead $a$ of the watch-rim. The die F is made of a square wire or a wire rectangular in cross-section, to which a pattern or ornamentation has been imparted by rolls or otherwise on one side thereof. The wire so rolled and ornamented is bent spirally by winding it on a cylindrical arbor of suitable diameter. The spiral coils thus formed are cut into sections by sawing them in a direction lengthwise of the arbor. The split rings thus formed are flattened to bring their edges into the same plane. Each ring so coiled and flattened is now serviceable as a die. It is preferred that the split-ring die so formed shall be tempered, so as to give it a certain elasticity or resilience. This split-ring die F is placed on the outside of the blank A, as shown in Figs. 11 and 14.

G is a plunger of a hydraulic or other press, whose lower end is fashioned into a plane annular face $g$ and a female die $g'$, adapted to shut down over the edges of the nut E, as seen in Fig. 11.

H is a die-block having a central bore which is circular, the upper portion of which has flaring or tapering sides, as shown at $h$, a straight portion, as indicated at $h'$, of a certain diameter, which I will presently specify, and at its bottom a straight circular bore $h''$ of a larger diameter.

I is a die of a diameter to fit the portion $h'$ of the bore of the die-block H. The diameter of the die I is enlarged somewhat, as shown at $i$, to form an annular flange, said enlarged diameter being such as to enable said portion of the die I to fit in the portion $h''$ of the bore of the die-block H, but said flange is not as thick on its edge as the depth of said enlarged bore $h''$, and therefore leaves a clear space or annular chamber $h'''$. Said die I has a central straight tubular bore $i'$ and at its upper end proper female die-faces $i''$ to impart the desired shape to the blank of the watch-rim, as fully shown in Fig. 11.

The operation of my said device is as follows: The dies B B C C are first placed within the annular blank A and then spread apart by the insertion of the square hub $d$ of the block D between them, as shown in Figs. 3 and 4. The nut E is then screwed down on the boss $d'$ of the block D, thus clamping the parts together. The split-ring die F is next placed outside of the blank A in the position shown in Figs. 11 and 14, and these dies B B C C F, block D, and nut E, with the blank A, all arranged as described, are placed within the conically-shaped aperture $h$ of the die-block H, where they are supported by the bottom edge of the ring-die F, resting in contact on the beveled or tapering surface of said aperture $h$ of said die-block H. The plunger G now descending with great power comes first in contact with the peripheral portions of the dies B B C C and nut E by its own die $g'$. The first effect is to force downwardly the ring-die F, whose upper edge is pressed by the annular face $g$ of the plunger G. As the lower edge of said ring-die is supported on a beveled or angular surface of the aperture $h$ of the die-block H the ring-die F is contracted forcibly in diameter by this pressure of the plunger G, so that the two ends $m$ thereof are brought together and the inner engraved or embossed surface of said die F is pressed radially inward and imparts its pattern to the bead or outermost portion of the periphery of the blank, producing the ornamentation shown in Fig. 2 on the exterior of the watch-rim. This inward radial contraction of the ring-die F is caused by the blow of the plunger, which brings the die F from the position shown in Fig. 11 until it closes and is of the diameter of the bore $h'$ of the die-block H, during which closing movement of the ring-die F the bottom edge thereof moves from the position seen in Fig. 11 downward along said sloping or beveled sides of the conical bore $h$ of the die-block H to the tubular bore $h'$ of said die-block. The die $g'$ of the plunger G and the die-faces $i''$ of the die I form the concentric and snapping edges $b\ c$ on the exterior surface of the watch-rim above and beneath the bead $a$ thereof, and the peripheral portions of the dies B B C C form the interior surfaces of said watch-rim, making them parallel to the exterior surfaces thereof, as shown in Fig. 2. At the completion of said formative operation the dies B B C C, block D, nut E, and finished watch-rim thereon together exactly fill the space between the die-faces of the plunger G and die I. To discharge the now finished watch-rim from that position, the die I is raised longitudinally in the die-block H, the flange $i$ thereof moving freely into the space or chamber $h'''$ of said die-block. This movement of the die I carries up the dies B B C C, block D, nut E, and the watch-rim thereon out of the matrix of the die I, and as soon as they clear said die the ring-die F by its resilience expands and separates from the bead $a$ of the watch-rim. Then by removing the nut E from the boss $d'$ of the block D the said block D is withdrawn from the dies B B C C and said dies are then removed from the watch-rim. The result of the operation is the watch-rim center shown in Figs. 1 and 2.

The dies usually employed in shaping watch-rims, especially the exterior thereof, are expensive and liable to fracture and injury. My ring-die F, which shapes and ornaments the bead of the watch-rim, is highly efficient, but very inexpensive, being formed of square wire, receiving its pattern or design from rolls, and made in long strips, which are wound spirally, as already described, and sawed into coil-sections of suitable length. Each of said coil-sections is flattened to make it lie in a plane throughout its whole extent. The ring-die thus formed is tempered and its ends $m$ normally lie spread apart. The elasticity of said ring-die makes it more flexible and less liable to breakage or injury; but whenever worn or impaired for any cause it can be readily duplicated at a trivial cost.

I claim as a novel and useful invention and desire to secure by Letters Patent—

1. In mechanism for making watch-rim centers, the combination of a die-block, having a tubular bore, which is provided with flaring or tapering sides at its top, opening outwardly, a die mounted in the die-block in the tubular portion thereof, dies adapted to receive on their edges and to support thereby the interior portions of a metallic annular blank, concavo-convex in cross-section, a plunger, whose end is fashioned into a die and adapted to coöperate with the die first aforesaid to shape said blank, and a split-ring die, adapted to surround and form the bead or central, peripheral part of the watch-rim center on the exterior of the latter, and having its ends normally spread apart, and its edge supported on the tapering sides of the bore of said die-block, but movable along said tapering sides by means of said plunger, and closable by said movement, substantially as shown and for the purpose specified.

2. The split-ring die F, herein described, having its ends $m$ normally spread apart, but closable by an inwardly-directed lateral pressure, and provided with an ornamental configuration on its interior surface, together with means adapted to close said ring-die upon a blank therein and to impart by such closure its configuration reversely to said blank, substantially as specified.

3. The combination of the segmental dies B, B, and the dies C, C, having each an arc-shaped edge and three plane sides and arranged within said annular blank so that their curved edges form a true circle and their plane sides opposite said curved edges, respectively, are arranged to leave a central square aperture, a block D having a central square hub $d$, adapted to fill said aperture and provided with a screw-threaded boss $d'$, and a circular nut E, engageable with said boss $d'$, all combined as shown and adapted to shape the interior surface of an annular blank, the split-ring die F, having its ends $m$ normally spread apart and arranged to surround said annular blank on the periphery thereof but closable by an inwardly-directed lateral pressure and having its interior surface made with an ornamental configuration to constitute a die-face, which is adapted by said closure to impart said configuration reversely to said blank, together with means for closing said die, substantially as shown.

HUXHUM P. KENT.

Witnesses:
MABEL FOSTER,
WARREN R. PERCE.